INVENTOR.
GEORGE R. POLEN
BY Alfred C. Hill
AGENT

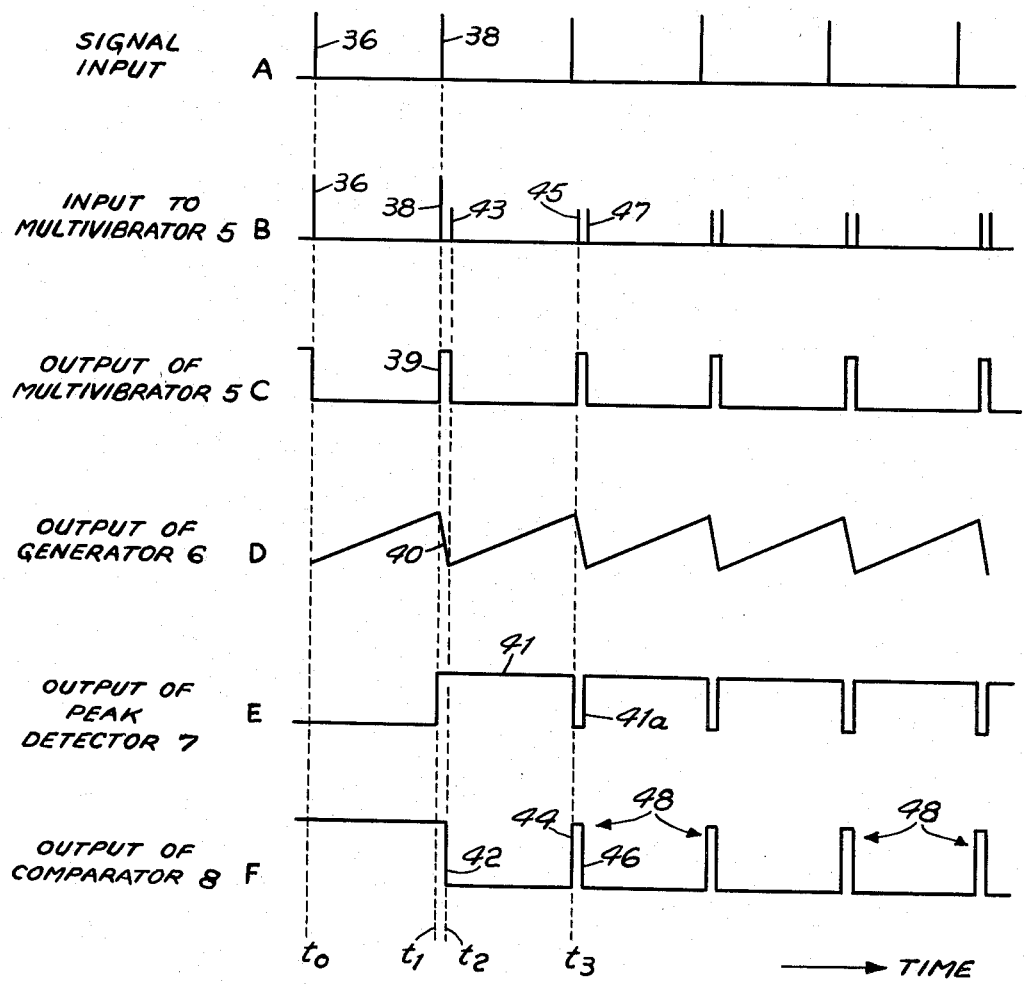

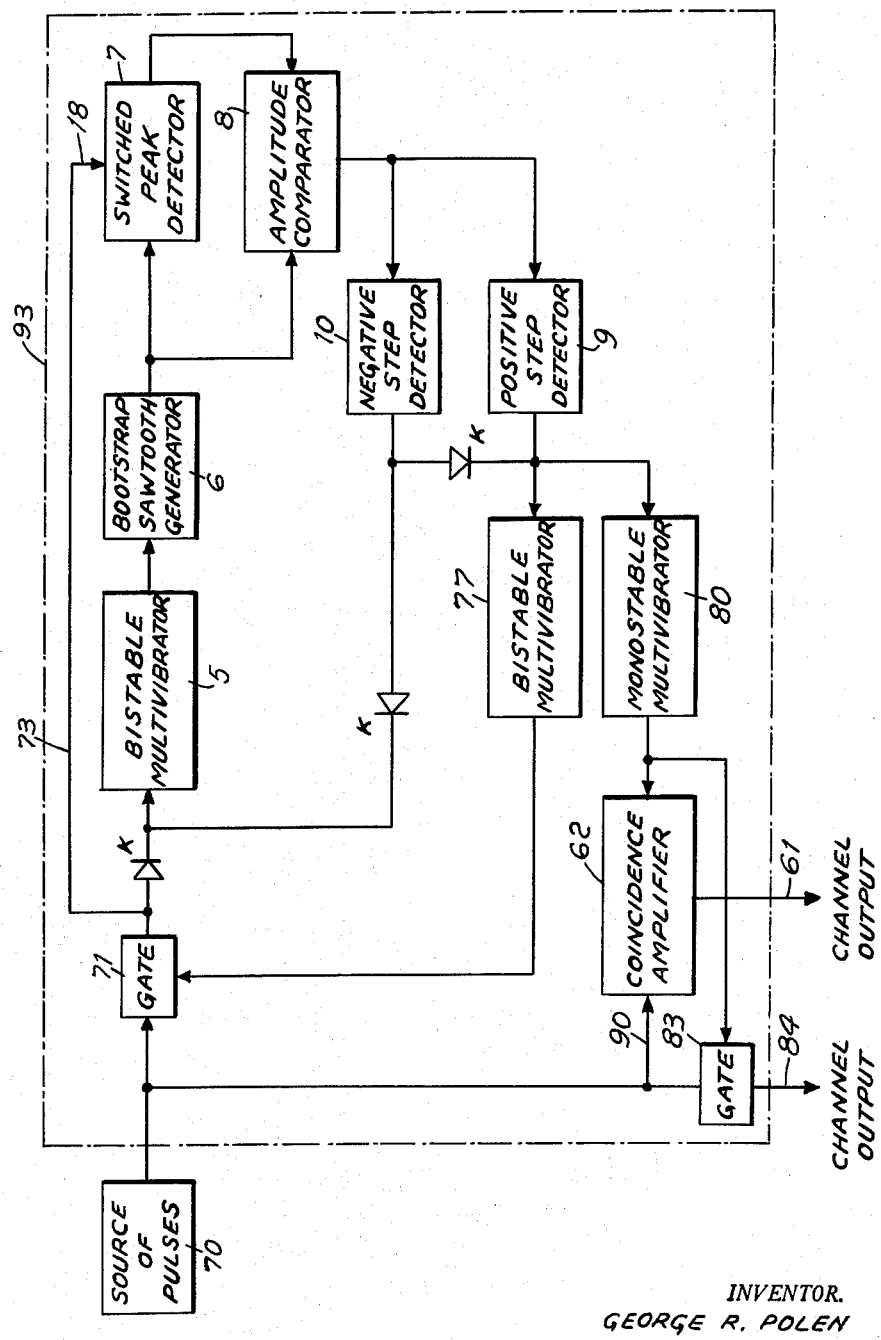

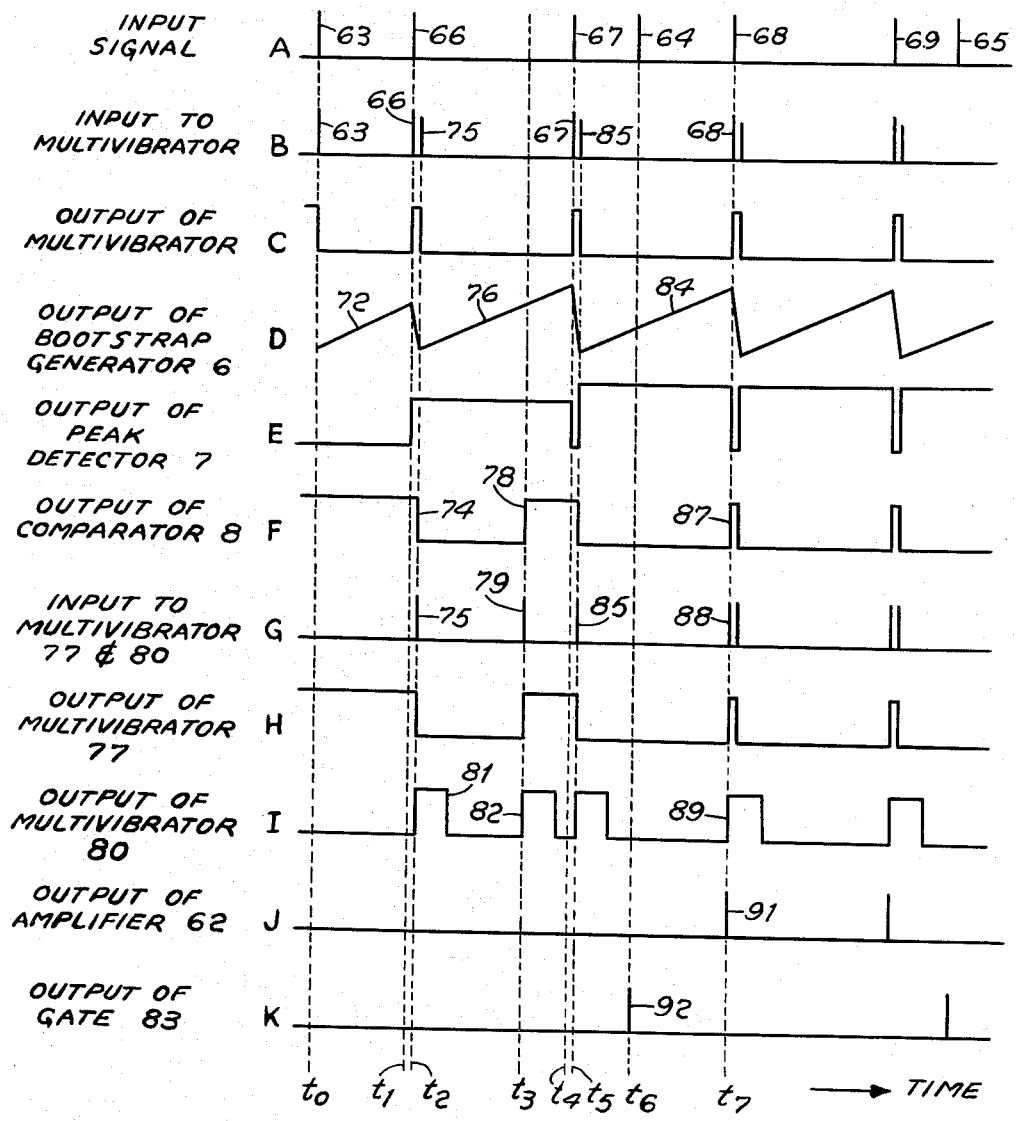

United States Patent Office 2,996,665
Patented Aug. 15, 1961

2,996,665
PULSE TIME INTERVAL SELECTION AND CONTROL SYSTEM
George R. Polen, Passaic County, N.J., assignor to International Telephone and Telegraph Corporation, Nutley, N.J., a corporation of Maryland
Filed Mar. 13, 1959, Ser. No. 799,385
20 Claims. (Cl. 324—68)

This invention relates to pulse systems and more particularly to a pulse time interval selection and control system therefor.

The generation of a plurality of pulses spaced one from the other by a given time interval plays an important role in present-day electronic systems, such as computers, automatic control systems and time division multiplex multichannel communication systems, to time the occurrence of phenomena therein. In the past several pulse time interval control systems, electromechanical and electronic, have been proposed for the generation of these pulses spaced by a given time interval. The preferred arrangement, prior to the present discovery, to produce such time spaced pulses included a source of repetition trigger signals to periodically excite a time delay line having output taps spaced therealong to provide a plurality of pulses having a desired time interval therebetween.

In certain applications, the spacing of the output taps along the delay line could be equal to provide a given constant time interval between adjacent ones of a plurality of pulses. This is the type of arrangement that would be employed to control certain regularly recurrent phenomena, such as the separation of the individual channel pulse train from the usual time division multichannel pulse train and the control of certain operations in computers and automatic control systems. In other applications, the spacing of the output taps along the delay line could be unequal, but in accordance with a known relationship, to provide a plurality of pulses having a time interval between adjacent pulses which changes in accordance with said known relationship. This type of arrangement could be employed to control certain phenomena which follow said known relationship, such as may occur in certain operations of a computer. In each of these arrangements the length of the delay line, the number of output taps, the physical spacing of the output taps along the delay line and the repetition rate of the trigger pulse source must be set in accordance with a known spcification for each particular system in which the pulse time interval control system of this type is employed.

In certain applications where the above type of pulse time interval control system is employed to control phenomena relating to a signal originating at a remote location, it is necessary to provide in addition to the information-containing signal, a signal capable of synchronizing the pulse time interval control system with the timing of the remotely produced signal. The space occupied by such a synchronizing signal reduces the number of information-containing signals. For instance, in multichannel systems the synchronizing signal reduces by at least one the number of channels available in the multichannel system.

Another category of possible signals upon which it may be desired to operate to control phenomena relative thereto includes time interlaced pulse trains having different, randomly related repetition rates, in other words, having different, randomly related time intervals between adjacent pulses of the pulse trains and therefore, random, unpredictable time intervals between the adjacent pulses of the interlaced pulse trains. The above-described prior art pulse time interval control systems cannot be employed to control phenomena relative to these signals, such as pulse train separation, since there is no known time relationship between adjacent pulses of the interlaced pulse train signal to enable the determination of the necessary delay line length, the determination of location of the output taps along the delay line and the determination of the repetition rate of the output of the trigger pulse source.

Therefore, an object of this invention is to provide an improved pulse time interval control system overcoming certain of the disadvantages and shortcomings of the prior systems.

Another object of this invention is to provide a pulse time interval control sytem which does not employ tapped delay lines.

Still another object of this invention is to provide a pulse time interval control system which does not require synchronization by locally generated trigger signals or remotely generating synchronizing signals.

A further object of this invention is to provide a pulse time interval control system whose operation is initiated by the pulses for which certain phenomena are to be controlled by the output pulses of said control system.

Still a further object of this invention is to provide a pulse time interval control system which selects its pulse time interval from the time spacing between two of the input pulses applied to the system with which said control system is employed and then repeats said time interval without further external influence.

A further object of this invention is to provide a pulse time interval control system capable of enabling the separation of individual pulse trains from time interlaced pulse trains regardless of whether said individual pulse trains have equal repetition rates or randomly related repetition rates.

A feature of this invention is the provision of means responsive to the time interval between two pulses to automatically produce pulses spaced by said time interval.

Another feature of this invention is the provision of means responsive to two pulses to produce a voltage having an amplitude representative of the time interval between said two pulses and means to automatically produce responsive to said voltage, pulses marking said time interval.

Still another feature of this invention is the provision of means responsive to two time-adjacent pulses to produce a wave having a repeated waveform whose duration is equal to the time interval between said time-adjacent pulses and means coupled to automatically produce in response to said repeated waveform pulses spaced by said time interval.

A further feature of this invention is the provision of means responsive to two time-adjacent pulses to produce a sawtooth waveform having a period equal to the time interval between said two time-adjacent pulses, means coupled to said responsive means for repeating said sawtooth waveform after the occurrence of said two time-adjacent pulses and means for producing pulses spaced by said time interval.

Still a further feature of this invention is the provision of a means responsive to pulses of one pulse train of a plurality of interlaced pulse trains to produce a voltage having an amplitude representative of the time interval between time-adjacent pulses of said one pulse train, means to automatically produce in response to said voltage a plurality of control pulses spaced by said time interval after the occurrence of said time-adjacent pulses, and means responsive to said control pulses to separate said pulse trains from each other.

The above-mentioned and other features and objects of this invention will become more apparent by reference to the following description taken in conjunction with the accompanying drawings, in which:

FIG. 2 is a series of waveforms useful in explaining the operation of FIG. 1;

FIG. 3 is a schematic diagram, in block form, of a modification of the system of FIG. 1 enabling the separation of time interlaced pulse trains having randomly related repetition rates; and FIG. 4 is a series of curves useful in explaining the operation of FIG. 3.

Figure 1:
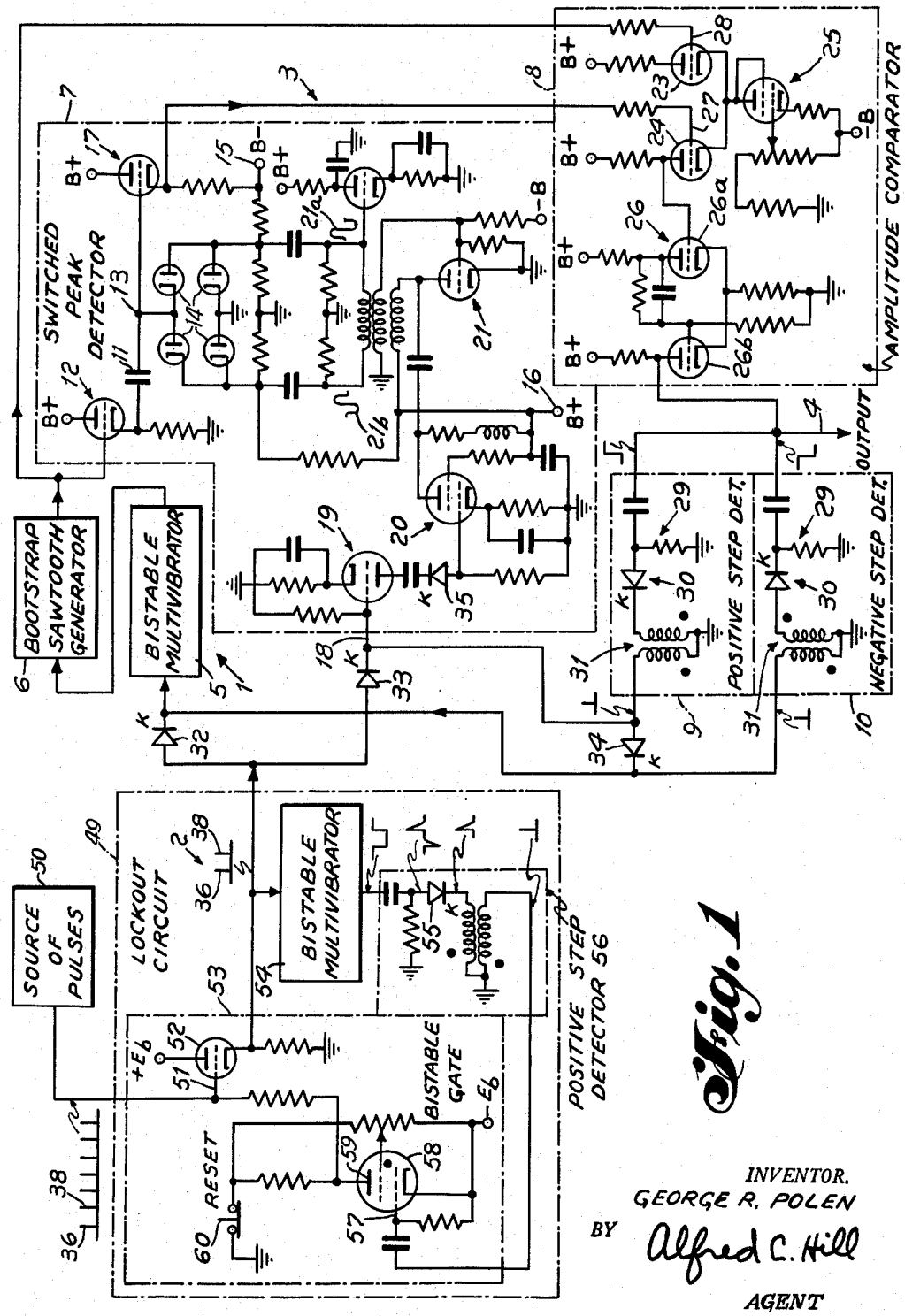
FIG. 1 is a schematic diagram, partially in block form, of the pulse time interval selection and control system of this invention.

Referring to FIG. 1, the pulse time interval selection and control system of this invention is illustrated as including broadly a means 1 responsive to input pulses 2 to produce a voltage having an amplitude representative of the time interval between pulses 2 and a means 3 coupled to means 2 to automatically produce in response to the voltage output of means 1 pulses at output 4 spaced by the time interval of pulses 2. Effectively the system of this invention has the ability to memorize the time interval between two pulses and then repeat this time interval automatically marking it with pulses without further external stimulation.

More specifically means 1 includes a symmetrically triggered bistable multivibrator 5 switched from a first stable level to a second stable level by the first of pulses 2 and then back to the first stable level by the second of pulses 2. The amplitude levels of multivibrator 5 control the operation of a bootstrap sawtooth generator 6 in a manner whereby the first of pulses 2 initiate the start of a sawtooth waveform and the second of pulses 2 terminate the sawtooth waveform. Thus, the first level (a relatively high level) of multivibrator 5 will stop the charging of generator 6 and the second level (a relatively low level) will start the charging of generator 6. Hence, through the cooperation of multivibrator 5 and sawtooth generator 6 a time base is developed for the system being equal to the time interval between pulses 2. At the same time a voltage is developed having an amplitude proportional to the duration of the sawtooth waveform and hence representative of the time interval between the pulses 2.

Means 3 more specifically includes a switched peak detector 7 which stores the amplitude to which the sawtooth waveform rose during the time interval between the first and second pulse of pulses 2, an amplitude comparator 8 to indicate when the output of generator 6 has risen to the same amplitude it had attained on the previous cycle of operation and a pair of step detectors 9 and 10 to reset and restart the system after each cycle of operation to render the system automatic without further external triggering.

In FIG. 1, schematic diagrams are illustrated as an example of the circuitry that could be utilized to provide the desired end results of the switched peak detector 7, amplitude comparator 8 and the step detectors 9 and 10.

Switched peak detector 7 is illustrated as including a storage condenser 11 isolated from the output of generator 6 by cathode follower 12. Point 13 is connected to diodes 14 which are biased by voltages at terminals 15 and 16 to be non-conductive thereby leaving condenser 11 in a so-called "floating" condition. Thus, the charge on the plate of condenser 11 adjacent cathode follower 12 will also appear on the other plate thereof. This enables the coupling of the stored energy on condenser 11 to amplitude comparator 8 through isolation cathode follower 17. Also due to the arrangement including diodes 14, once condenser 11 is charged, it will maintain this charge. To place a charge on condenser 11, or to change the magnitude of the charge, condenser 11 must be momentarily grounded to permit the storage of a new or different charge thereon. To bring about this sampling operation, a pulse (the input to multivibrator 5 or the output of step detector 9) is applied to the selector input 18 of detector 7. This selector pulse is amplified in amplifiers 19 and 20 and then applied to a monostable blocking oscillator 21. The output of oscillator 21, as shown in curves 21a and 21b, overcomes the bias applied to diode 14 from terminals 15 and 16 causing them to conduct. The conduction of diodes 14 momentarily grounds point 13 and hence condenser 11. This removes the charge from condenser 11 permitting condenser 11 to sample the output of generator 6 and to charge to the level thereof at the time of sampling.

Amplitude comparator 8 includes a differential amplifier including tubes 23 and 24, having a common constant current cathode impedance 25. Impedance 25 maintains the total current in tubes 23 and 24 constant regardless of changing conduction conditions thereof. The output of the differential amplifier is coupled to a Schmitt trigger circuit 26 (a cathode coupled bistable multivibrator). The output of cathode follower 17 (the reference voltage) is coupled to grid 27 of tube 24 and the output of sawtooth generator 6 is coupled to grid 28 of tube 26. The function of amplitude comparator 8 is to compare the amplitude of the two inputs thereto and to produce positive or negative voltage steps depending upon whether the amplitude of the sawtooth waveform is equal to or less than the reference voltage applied from detector 7. A negative voltage step at output 4 is provided when the amplitude of the output of detector 7 exceeds the amplitude at the output of generator 6. A positive voltage step at output 4 is provided when the amplitude of the output of generator 6 becomes equal to or exceeds the reference voltage present at the output of detector 7.

These voltage steps are provided by the circuitry illustrated as follows. If the voltage at grid 28 is less than the voltage at grid 27, tube 24 will be conducting heavier than tube 23. The anode voltage of tube 24 will be relatively low cutting off tube 26a, raising the anode voltage thereof and hence causing tube 26b to conduct. The conduction of tube 26b lowers the anode voltage thereof producing a negative voltage step. Now if the output of generator 6 equals or exceeds the reference voltage at the output of detector 7, tube 23 will increase in conduction. Since the total tube currents are maintained constant by impedance 25, the conduction of tube 24 will decrease. This raises the anode voltage of tube 24 which in turn causes tube 26a to conduct reducing its anode voltage and thereby rendering tube 26b non-conductive. The non-conduction of tube 26b raises the anode voltage thereof and hence produces a positive voltage step.

Step detectors 9 and 10 are illustrated as including differentiators 29, a clamping diode 30 and a pulse transformer 31. Whether the step detectors detect a positive or negative step depends upon the polarity of the diode 30. As illustrated positive step detector 9 has the anode of diode 30 connected to the differentiator 29 while the negative step detector 10 has the cathode of diode 30 connected to the differentiator 29. Since in the operation of the system of this invention it is necessary to have a positive pulse at the output of the step detectors 9 and 10 to reset and restart the cyclic operation of this system, it is necessary to reverse the windings of the pulse transformer 31 in negative step detector 10 so that there is produced from detector 10 a positive pulse. The reversal of the windings of pulse transformer 31 are indicated by the location of the polarity dots in each of the step detectors 9 and 10.

Several crystal diodes, such as diodes 32, 33, 34 and 35 are included in the circuitry of this control system to assure that only the proper polarity pulse is passed and also to prevent interaction between the various circuits of this system.

To facilitate the understanding of the operation of the pulse time interval selection and control system of this invention a sequential description of the operation follows hereinbelow in conjunction with the waveforms illustrated in FIG. 2.

At time $t_0$ pulse 36 of pulses 2 appears at the input of multivibrator 5. Multivibrator 5 is flipped from its higher to its lower stable condition to initiate operation of the bootstrap generator 6 as indicated in curves B, C and D of FIG. 2. Pulse 36 is applied through diode 33 to selector input 18 of peak detector 7. This will cause condenser 11 to sample the output of generator 6 but since the sawtooth amplitude is substantially zero condenser 11 will not charge and hence no output is developed from the peak detector 7, curve E, FIG. 2.

At time $t_1$ the second pulse, pulse 38 of pulses 2, appears at the input of multivibrator 5. Multivibrator 5 is flipped from its lower stable point to its higher stable point as indicated by line 39 in curve C, FIG. 2. This terminates the charging of bootstrap generator 6 and hence terminates the sawtooth waveform output therefrom. The sawtooth amplitude decays rapidly to zero as indicated by line 40 in curve D, FIG. 2. Simultaneously with the termination of the sawtooth waveform pulse 38 is coupled to selector input 18 of detector 7 causing condenser 11 to charge up to the peak value of the sawtooth waveform at the instant this waveform is terminated as shown at 41 in curve E, FIG. 2. This amplitude level on condenser 11 is coupled to grid 27 of tube 24 in amplitude comparator 8. Just slightly after the termination of the sawtooth waveform, say at time $t_2$, amplitude comparator 8 determines that the sawtooth amplitude is less than the output of peak detector 7 and hence develops a negative step as indicated by line 42, curve F, FIG. 2. The negative step detector 10 in response to this negative step develops a positive output pulse 43 (curve B, FIG. 2) which flips multivibrator 5 back to its lower stable condition to start the charging of the bootstrap generator 6 for production of the sawtooth waveform. The sawtooth waveform at the output of generator 6 will rise to an amplitude equal to the voltage stored in condenser 11 of peak detector 7 at which time, time $t_3$, comparator 8 will produce a positive step 44, curve F, FIG. 2, which causes positive step detector 9 to produce a positive pulse 45 at the output theerof. Pulse 45 appears at selector input 18 of peak detector 7 causing condenser 11 to resample the sawtooth amplitude. Since the amplitude of sawtooth waveform has attained the same amplitude as was previously stored in condenser 11 there will be no change in the amount of charge on condenser 11. As was pointed out above condenser 11 is completely discharged and then recharged when point 13 is momentarily grounded in the sampling process. This is illustrated by portion 41a of curve E, FIG. 2.

Simultaneously pulse 45 flips multivibrator 5 to its higher stable condition to stop the charging of the bootstrap generator 6 which causes the sawtooth amplitude to rapidly drop to zero. Amplitude comparator 8 senses that the sawtooth amplitude at the output of generator 6 has dropped below the stored voltage in detector 7 and hence develops a negative step 46. Negative step detector 10 produces a pulse 47 responsive to negative step 46 which flips multivibrator 5 back to its lower stable state to start the charging of bootstrap generator 6 for the production of the sawtooth waveform. The system is now in its automatic mode of operation and will continue to repeat the operation hereinabove outlined starting at time $t_3$. It will be noted in curve F, FIG. 2 that positive step 44 and negative step 46 actually form a pulse 48 which marks the time interval selected by this pulse time interval control system, the time interval being equal to the time interval between input pulses 36 and 38. While in its automatic mode the system of this invention will produce a plurality of pulses 48 spaced by the selected time interval.

Once the system has begun automatic operation some provision must be provided to prevent the injection of any additional external pulses other than pulses 36 and 38. This may be accomplished by employing lockout circuit 49 which will pass only pulses 36 and 38 of the input pulse train supplied from source 50, said input pulse train being illustrated in curve A, FIG. 2, to illustrate the relationship between pulses 36 and 38 and other pulses that may be in the input signal. Lockout circuit 49 operates as follows: Pulse input from source 50 is applied to grid 51 of tube 52 forming a part of bistable gate 53. Tube 52 is in a conducting condition when pulse 36 is applied thereto. Pulse 36 is coupled from the cathode of tube 52 to the input of multivibrator 5 and also to the input of symmetrically triggered bistable multivibrator 54. Pulse 36 triggers bistable multivibrator 54 from its higher state to its lower state thereby causing a negative voltage step. This negative voltage step does not affect the operation of tube 52 since it is blocked by diode 55 in the positive step detector 56. When the second pulse, pulse 38, is passed through tube 52, multivibrator 54 is flipped from its lower state to its higher state thereby causing a positive step. This positive step is detected by step detector 56 and applied to the grid 57 of gas thyratron 58. The positive pulse applied from the output of detector 56 to grid 57 of the thyratron causes the thyratron to fire. The anode 59 will be driven negative and hence cut-off tube 52 by driving grid 51 of tube 52 beyond cut off. The rendering of tube 52 non-conductive blocks any further pulses from being applied of the input of multivibrator 5 and, hence, locks out all pulses except pulses 36 and 38. When tube 52 is cut off, a negative transient is developed in the cathode thereof but this will not affect the operation of multivibrator 5 since diode 32 blocks this negative transient from the input of multivibrator 5.

To reset lockout circuit 49 to ready the system of this invention for the operation on another signal input, reset switch 60 may be activated either manually or automatically to remove the ground from the anode circuit of thyratron 58 which causes thyratron 58 to deionize.

The system described in FIG. 1 has many desirable features particularly for those applications where it is necessary to time the operation of the input signals having constant time interval between adjacent pulses. The system of FIG. 1 can be readily adapted to separate time interlaced pulse trains of different randomly related repetition rates. The circuit of FIG. 3 illustrates how the basic circuit of FIG. 1 may be modified to accomplish the separation of time interlaced pulse trains having randomly related repetition rates.

Components of FIG. 3 which function as described in detail in FIG. 1 will have applied thereto the same reference characters as those employed in FIG. 1.

The ability of the device of FIG. 3 to perform the function of separation of interlaced pulse trains of random repetition rates is based on the assumption that, at some time, two members of the same pulse train are time adjacent. If only two pulse trains are present, this must occur. If several trains are present, the probability of this occurring within a relatively short time is considered excellent. In operation, the system of FIG. 3 memorizes the time interval between time adjacent pulses. If a third pulse arrives as predicted, spaced by the memorized time interval from the second pulse, it is sent to output 61 by means of coincidence amplifier 62. If the third pulse does not arrive as predicted, the system memorizes the new time interval and searches again for a third pulse spaced from the preceding pulse by the new time interval. The basic device described herein for separating two pulse trains for purposes of explanation, may be incorporated in a channelizing arrangement to select as many pulse trains as desirable from the input with one output channel required for each pulse train to be selected.

To facilitate the understanding of the operation of the system of FIG. 3, a description of the operation is set down hereinbelow with reference to the curves of FIG. 4, Curve A of FIG. 4 illustrates a typical input signal having two time interlaced pulse trains. Pulses 63, 64 and 65 constitute one pulse train while pulses 66, 67, 68 and 69 constitute the pulses of the second pulse train. At time $t_0$ pulse 63 is passed through closed gate 71 and hence to the input of multivibrator 5 (curve B, FIG. 4) to flip the output of multivibrator 5 to the lower level, as illustrated in curve C, FIG. 4, to drive the bootstrap sawtooth generator 6 so that a sawtooth waveform, as illustrated by line 72 in curve D, FIG. 4, is started. Pulse 63 is coupled also along conductor 73 to the selector input 18 of switched detector 7. However, at time $t_0$ the sawtooth amplitude is zero and hence peak detector 7 has no output as illustrated in curve E, FIG. 4.

At time $t_1$ pulse 66 is coupled to the input of multivibrator 5 and along conductor 73 to the selector input of detector 7. Detector 7 charges up to the peak amplitude of the sawtooth waveform, as illustrated in curve E, FIG. 4. Simultaneously multivibrator 5 is flipped to its higher stable state, curve C, FIG. 4, to stop the charging of the bootstrap generator 6 thereby terminating sawtooth waveform of curve D, FIG. 4, which will rapidly decay to zero. At time $t_2$, amplitude comparator 8 finds the sawtooth amplitude less than the output of peak detector 7 and thus, develops a negative step 74, curve F, FIG. 4. The negative detector 10 develops an output pulse 75. Pulse 75 flips multivibrator 5 back to its lower stable level to charge bootstrap generator 6 to start the generation of sawtooth waveform 76, as illustrated in curve D, FIG. 4. Pulse 75 is also coupled to the input of symmetrically triggered multivibrator 77 and monostable multivibrator 80. Multivibrator 77 is triggered to its lower stable condition, curve H, FIG. 4, causing gate 71 to open and thus prevent the passage of input signals for a given time to the input of multivibrator 5. Multivibrator 80 is triggered to produce an output pulse 81, as shown in curve I, FIG. 4, which is coupled to amplifier 62. However, no output from amplifier 62 will result since no pulse of the input signal is time coincident with pulse 81.

At time $t_3$ sawtooth waveform 76 has risen to the voltage stored in detector 7. Amplitude comparator 8 produces a positive step 78, curve F, FIG. 4, which is detected by positive step detector 9 and produces an output pulse 79. Pulse 79 triggers multivibrator 77 to its higher stable state to close gate 71 permitting the entry of signals into the system. Pulse 79 further applies a pulse to monostable multivibrator 80 to trigger multivibrator 80 from its stable to an unstable condition for a given interval as indicated by pulse 82, curve I, FIG. 4, to provide a time interval for which an output may be developed from coincidence amplifier 62 if an input pulse is present in this time interval. The output of multivibrator 80, pulse 82, is also applied to gate 83 opening gate 83 so that signals from source 70 will not enter channel 84 during this time interval.

During the time interval provided by multivibrator 80 in the form of pulse 82 the system is seeking an input pulse spaced from the second input pulse by the memorized time interval, hence, a third pulse of the same pulse train. If this third pulse does appear within the time interval of pulse 82, the system decides that pulses 63 and 66 are not members of the same pulse train. In this example pulse 67 did not appear during the search interval generated by multivibrator 80. Therefore, the system will now wait and continue to produce a sawtooth waveform until time $t_4$ when pulse 67 enters the system. The system will then determine if pulses 66 and 67 are members of the same pulse train.

At time $t_4$ pulse 67 is passed through gate 71 and appears at the selector input 18 of peak detector 7 causing peak detector 7 to sample the new amplitude of the sawtooth waveform. Pulse 67 triggers multivibrator 5 to the condition where the output therefrom stops charging the bootstrap generator 6 hence terminating the sawtooth 76. At time $t_5$ the sawtooth 76 has decayed to zero and amplitude comparator 8 senses that the sawtooth at the output of generator 6 is of lower amplitude than the output of peak detector 7 and hence develops a negative step. Step detector 10 detects this negative step and produces an output pulse 85. Pulse 85 triggers multivibrator 77 to its lower stable condition to open gate 71 to prevent further input pulses from arriving at the input of multivibrator 5. Simultaneously pulse 85 triggers multivibrator 5 to the condition where the bootstrap generator is caused to produce a sawtooth waveform. Pulse 85 also produces output of multivibrator 80 which will not cause amplifier 62 to select since no input pulse is time coincident therewith.

At time $t_7$ sawtooth waveform 86 achieves an amplitude equal to the amplitude stored in peak detector 7. Amplitude comparator 8 detects this condition and produces a positive step 87. Step detector 9 responds to the positive step and produces a pulse 88 at the output thereof. Pulse 88 triggers multivibrator 77 to its higher stable condition to close gate 71. Pulse 88 also triggers multivibrator 80 to provide another time interval as indicated by pulse 89 of curve I, FIG. 4. The output of multivibrator 80, pulse 89, is applied to coincidence amplifier 62. Pulse 89 is also coupled to gate 83 for the opening thereof so that input signals cannot pass therethrough.

Pulse 68 enters the system at time $t_7$ time coincident with the time interval of pulse 89. Pulse 68 passes through gate 71 and appears at the selected input 18 of the peak detector causing the peak detector 7 to sample the amplitude of the sawtooth waveform and simultaneously triggers multivibrator 5 to terminate the sawtooth waveform thus starting the pulse time interval selection and control system to recycle in a manner as described hereinabove starting at time $t_4$ to repeat this new time interval. Since pulse 68 appears at input 90 of coincidence amplifier 62 simultaneously with the time interval as defined by pulse 89, an output pulse 91 is coupled to output 61 of amplifier 62.

At time $t_6$ pulse 64 arrives at the input of gate 83. Since gate 83 was closed at that time by the stable output of multivibrator 80, curve I, FIG. 4, pulse 64 was permitted to pass therethrough to channel output 84. This output pulse is indicated in curve K, FIG. 4, by pulse 92. Pulse 64 could not pass through gate 71 to multivibrator 5 since gate 71 was opened by the lower stable level output of multivibrator 77, curve H, FIG. 4.

The system has now decided that pulses 66, 67 and 68 are members of the same pulse train and will now continue to repeat this interval selecting the succeeding pulses of the pulse train for the output 61 by means of the coincidence amplifier 62. The other pulses in the time interlaced pulse trains will be applied through gate 83 to output 84. With the utilization of this pulse train separation system accurate reproduction of the pulse train is assured since the system does not refabricate pulse frequencies or shape but actually selects each pulse from the input signals.

The description hereinabove was directed toward the separation of two pulse trains. To adapt this system to separate more than two pulses it would be necessary to employ a number of banks of equipment as illustrated in box 93. For instance, to separate three pulse trains, one pulse train would be separated from the three pulse trains as described above and be present in channel output. The output of gate 83 would include two interlaced pulse trains. The interlaced pulse train output of gate 83 would then be operated on as described above by a second bank of equipment as illustrated in box 93 to separate these two interlaced pulse trains. It may be generally stated that for $n$ interlaced pulse trains ($n-1$) banks of equipment, as illustrated in box 93, must be employed.

While I have described above the principles of my invention in connection with specific apparatus, it is to be clearly understood that this description is made only by way of example and not as a limitation to the scope of my invention as set forth in the objects thereof and in the accompanying claims.

I claim:

1. A pulse time interval selection and control system comprising a source of time spaced pulses, means coupled to said source responsive to two pulses of said time spaced pulses to produce a voltage having an amplitude representative of the time interval between said two pulses, and means coupled to said responsive means to automatically produce in response to said voltage a plurality of pulses spaced by said time interval for a given period of time after the occurrence of said two pulses.

2. A pulse time interval selection and control system comprising a source of time spaced pulses, means coupled to said source responsive to two pulses of said time spaced pulses to produce a voltage having an amplitude varying in proportion to the time interval between said two pulses, and means coupled to said responsive means to automatically produce in response to said voltage a plurality of pulses spaced by said time interval for a given period of time after the occurrence of said two pulses.

3. A pulse time interval selection and control system comprising a source of time spaced pulses, means coupled to said source responsive to two pulses of said time spaced pulses to produce a wave having a repeated waveform whose duration is equal to the time interval between said two pulses, and means coupled to said responsive means to automatically produce in response to said repeated waveform a plurality of pulses spaced by said time interval for a given period of time after the occurrence of said two pulses.

4. A pulse time interval selection and control system comprising a source of time spaced pulses, means coupled to said source responsive to two pulses of said time spaced pulses to produce a wave having a repeated waveform with the spacing between the repeated waveforms equal to the time interval between said two pulses, and means coupled to said responsive means to automatically produce in response to said repeated waveform a plurality of pulses spaced by said time interval for a given period of time after the occurrence of said two pulses.

5. A pulse time interval selection and control system comprising a source of time spaced pulses, means coupled to said source responsive to two pulses of said time spaced pulses to produce a repeated sawtooth waveform having a period equal to the time interval between said two pulses, and means coupled to said responsive means to automatically produce in response to said repeated sawtooth waveform a plurality of pulses spaced by said time interval for a given period of time after the occurrence of said two pulses.

6. A pulse time interval selection and control system comprising a source of time spaced pulses, means coupled to said source responsive to two pulses of said time spaced pulses to produce a sawtooth waveform having a period equal to the time interval between said two pulses, and means coupled to said responsive means for repeating said sawtooth waveform for a given period of time after the occurrence of said two pulses and for producing pulses to indicate the terminations of said repeated saw tooth waveforms.

7. A pulse time interval selection and control system comprising a source of time spaced pulses, means coupled to said source responsive to two pulses of said time spaced pulses to produce a sawtooth waveform having a period equal to the time interval between said two pulses, means coupled to said responsive means to store the maximum energy achieved by said sawtooth waveform and means coupled to said responsive means and said storage means to trigger said responsive means for repetitious production of said sawtooth waveform and to simultaneously produce output pulses when the amplitude of said sawtooth waveform equals the magnitude of said stored energy.

8. A pulse time interval selection and control system comprising a source of time spaced pulses, means responsive to two pulses of said time spaced pulses to produce a saw tooth waveform having a period equal to the time interval between said two pulses, means coupled to said responsive means to store the peak energy achieved by said sawtooth waveform, means coupled to said means responsive and said storage means to trigger said means responsive for the repetitious production of said sawtooth waveform and to simultaneously produce output pulses when the amplitude of said sawtooth waveform equals the magnitude of said stored energy, and means coupled between said source and said responsive means responsive to the second of said two pulses to disconnect said source from said responsive means to prevent activation of said responsive means by others of said time spaced pulses.

9. A pulse time interval selection and control system comprising a source of time spaced pulses, means coupled to said source responsive to two time-adjacent pulses of said time spaced pulses to produce a voltage having an amplitude representative of the time interval between said time-adjacent pulses and means coupled to said responsive means to automatically produce in response to said voltage a plurality of pulses spaced by said time interval after the occurrence of said time-adjacent pulses.

10. A pulse time interval selection and control system comprising a source of time spaced pulses, means coupled to said source responsive to two time-adjacent pulses of said time spaced pulses to produce a voltage having an amplitude varying in proportion to the time interval between said time-adjacent pulses, and means coupled to said responsive means to automatically produce in response to said voltage a plurality of pulses spaced by said time interval after the occurrence of said two pulses.

11. A pulse time interval selection and control system comprising a source of time spaced pulses, means coupled to said source responsive to two time-adjacent pulses of said time spaced pulses to produce a wave having a repeated waveform whose duration is equal to the time interval between said time-adjacent pulses, and means coupled to said responsive means to automatically produce in response to said repeated waveforms a plurality of pulses spaced by said time interval after the occurrence of said two pulses.

12. A pulse time interval selection and control system comprising a source of time spaced pulses, means coupled to said source responsive to two time-adjacent pulses of said time spaced pulses to produce a wave having a repeated waveform with the spacing between the repeated waveforms equal to the time interval between said time-adjacent pulses, and means coupled to said responsive means to automatically produce in response to said repeated waveform a plurality of pulses spaced by said time interval after the occurrence of said two pulses.

13. A pulse time interval selection and control system comprising a source of time spaced pulses, means coupled to said source responsive to two time-adjacent pulses of said time spaced pulses to produce a repeated sawtooth waveform having a period equal to the time interval between said time-adjacent pulses, means coupled to said responsive means to automatically produce in response to said repeated sawtooth waveform a plurality of pulses spaced by said time interval after the occurrence of said two pulses.

14. A pulse time interval selection and control system comprising a source of time spaced pulses, means coupled to said source responsive to two time-adjacent pulses of said time spaced pulses to produce a sawtooth waveform having a period equal to the time interval between said time-adjacent pulses, means coupled to said responsive means for repeating said saw-tooth waveform for a given period of time after the occurrence of said time-adjacent pulses, and means for producing a plurality of pulses spaced by said time interval.

15. A pulse time interval selection and control system comprising a source of time spaced pulses, means coupled to said source responsive to two time-adjacent pulses of said time spaced pulses to produce a sawtooth waveform having a period equal to the time interval between said time-adjacent pulses, means coupled to said responsive means to store energy representative of the maximum amplitude achieved by said sawtooth waveform, and means coupled to said responsive means and said storage means to trigger said responsive means for repetitious production of said sawtooth waveform and to simultaneously produce output pulses when the amplitude of said sawtooth waveform equals the magnitude of said stored energy.

16. A pulse time interval selection and control system comprising a source of time spaced pulses, means responsive to two time-adjacent pulses of said time spaced pulses to produce a sawtooth waveform having a period equal to the time interval between said time-adjacent pulses, a peak detector means coupled to said responsive means to detect and store the peak energy achieved by said sawtooth waveform, an amplitude comparator coupled to said means responsive and said peak detector means to produce control signals, means coupled to said amplitude comparator responsive to said control signals to control the repetitious production of said sawtooth waveform, output means coupled to said amplitude comparator to remove an output pulse therefrom each time the amplitude of said sawtooth waveform equals the magnitude of the energy stored during the previous cycle of said sawtooth waveform, and means coupled between said source and said responsive means responsive to the second of said two pulses to disconnect said source from said responsive means to prevent activation of said responsive means by others of said time spaced pulses.

17. A pulse time interval selection and control system comprising a source of a plurality of time interlaced pulse trains having randomly related repetition rates, means coupled to said source responsive to pulses of one of said pulse trains to produce a voltage having an amplitude representative of the time interval between time-adjacent pulses of said one of said pulse trains, means coupled to said responsive means to automatically produce in response to said voltage a plurality of control pulses spaced by said time interval after the occurrence of said time-adjacent pulses, and means coupled to said automatic means and said source responsive to said control pulses to separate said pulse trains from each other.

18. A pulse time interval selection and control system comprising a source of a plurality of time interlaced pulse trains having randomly related repetition rates, means coupled to said source responsive to successive pulses of said plurality of pulse trains to produce a voltage having an amplitude varying in accordance with the time intervals between said successive adjacent pulses, means coupled to said means responsive to the amplitude of said voltage to produce a control signal when the amplitude of said voltage is constant, means responsive to said control signal to initiate repetitious production of said constant amplitude voltage, and means responsive to said control signal and said plurality of pulse trains to separate said pulse trains one from the other.

19. A pulse time interval selection and control system comprising a source of a plurality of time interlaced pulse trains having randomly related repetition rates, means coupled to said source responsive to successive pulses of said plurality of pulse trains to produce a sawtooth waveform having a time duration varying in accordance with the time intervals between said successive adjacent pulses, means coupled to said means responsive to the duration of said sawtooth waveform to produce a control signal when the time duration of said sawtooth waveform is constant, means responsive to said control signal to initiate repetitious production of said constant time duration sawtooth waveform, and means responsive to said control signal and said plurality of pulse trains to separate said pulse trains one from the other.

20. A pulse time interval selection and control system comprising a source of a plurality of time interlaced pulse trains having randomly related repetition rates, means coupled to said source responsive to first and second time adjacent pulses of said plurality of pulse trains to produce a voltage having an amplitude representative of the time interval between said first and second pulses, means coupled to said means responsive to store said voltage, comparator means coupled to said means responsive and said storage means to produce control signals indicative of the relative amplitude of said responsive means and said stored voltage, means responsive to said control signal and the pulses of said plurality of pulse trains to trigger said means responsive to vary the amplitude of said voltage in accordance with the time interval between succeeding time adjacent pulses until three pulses of said plurality of pulse trains successively initiate said means responsive to produce the same voltage amplitude, means coupling said control signals to said means responsive to initiate repetitious production of said voltage after said three pulses, and means coupled to said comparator means and said source responsive to said control signal after said three pulses to separate said pulse trains from each other.

References Cited in the file of this patent

UNITED STATES PATENTS

| | | |
|---|---|---|
| 2,841,709 | Price | July 1, 1958 |
| 2,886,775 | Gross | May 12, 1959 |
| 2,887,653 | Myers | May 19, 1959 |